Sept. 23, 1969  A. C. SAMPIETRO  3,468,190
MECHANISM FOR BALANCING RECIPROCATING MASSES
OF INTERNAL COMBUSTION ENGINES
Filed June 5, 1967  2 Sheets-Sheet 1
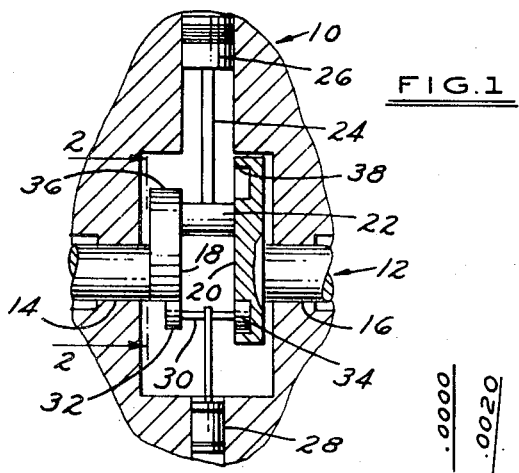
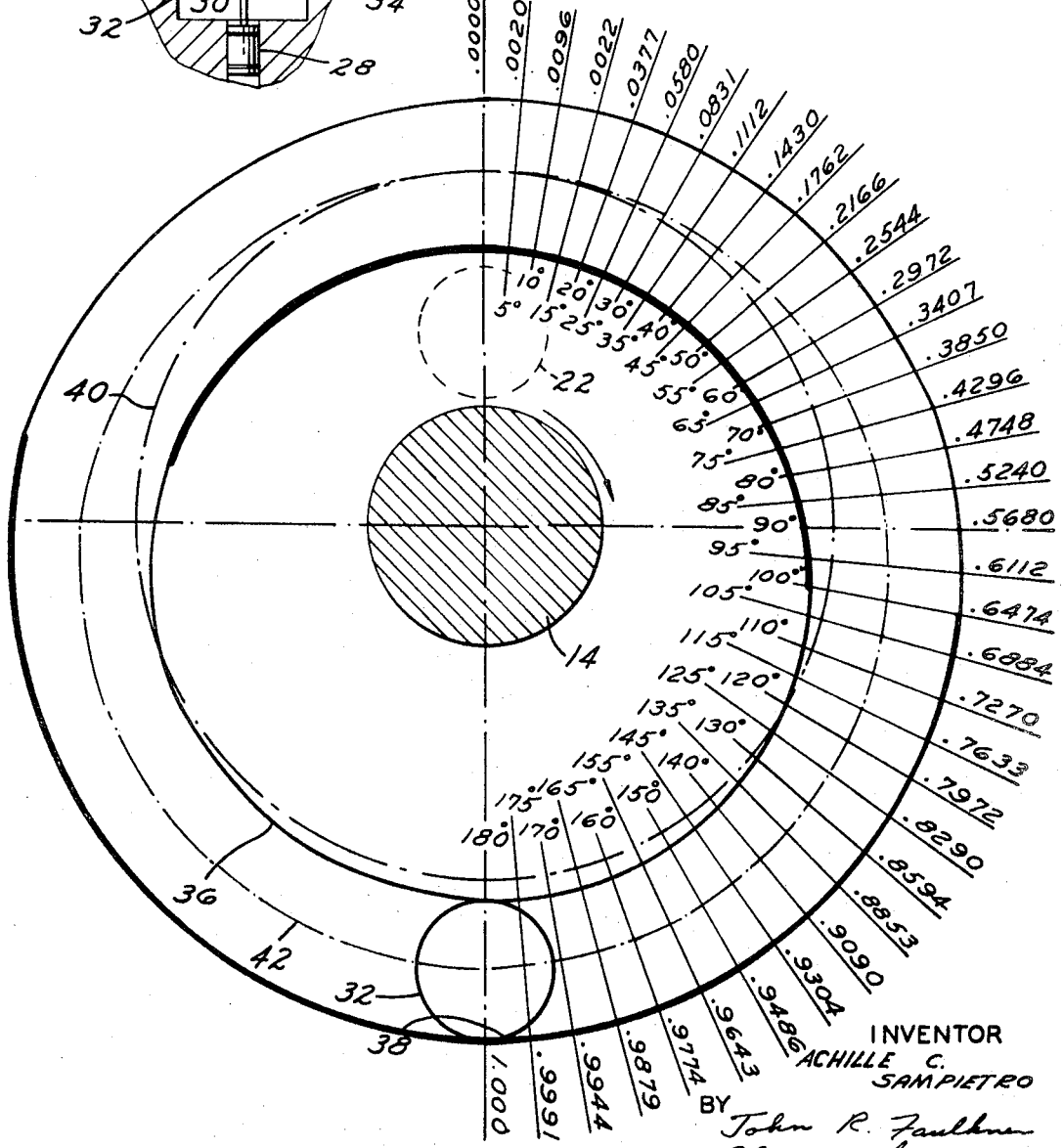
INVENTOR
ACHILLE C.
SAMPIETRO
BY
John R. Faulkner
Glenn S. ......
ATTORNEYS Sept. 23, 1969  A. C. SAMPIETRO  3,468,190
MECHANISM FOR BALANCING RECIPROCATING MASSES
OF INTERNAL COMBUSTION ENGINES Filed June 5, 1967  2 Sheets-Sheet 2

ACHILLE C. SAMPIETRO
INVENTOR

BY
ATTORNEYS

United States Patent Office 3,468,190
Patented Sept. 23, 1969

3,468,190
MECHANISM FOR BALANCING RECIPROCATING MASSES OF INTERNAL COMBUSTION ENGINES
Achille C. Sampietro, Bloomfield Hills, Mich., assignor to Ford Motor Company, Dearborn, Mich., a corporation of Delaware
Filed June 5, 1967, Ser. No. 643,622
Int. Cl. G05g 3/00, 1/00; F02b 75/06
U.S. Cl. 74—604                                      8 Claims

ABSTRACT OF THE DISCLOSURE

This mechanism balances the inertia forces of reciprocating pistons and connecting rods in an internal combustion engine. A balancing mass slidable in the engine block in the plane of the reciprocating piston is moved by two followers riding on separate cam surfaces formed on the cheeks of the crankshaft. One cam surface accelerates the balancing mass outward while the other decelerates outward motion of the mass and accelerates the balancing mass inward. After inward acceleration, the first cam surface takes over again to decelerate the inward motion. The cam surfaces are designed so they will move the balancing mass to produce inertia forces balancing the primary and/or secondary or higher harmonic inertia forces acting on the reciprocating pistons and connecting rods of the engine.

SUMMARY OF THE INVENTION

Rotating parts of internal combustion engines are balanced almost universally by affixing appropriate balancing weights thereto. The reciprocating parts of the engine, however, produce a harmonic series of inertia forces. Some of the components of the series, depending on the engine type, require balancing by a supplemental balancing mechanism. For example, single cylinder engines have unbalanced primary, secondary, and higher components while two and four-cylinder in-line and two-cylinder 90° V engines have only secondary and higher components unbalanced. Six and eight-cylinder in-line engines can be designed with perfect primary and secondary balance, while eight-cylinder 90° V engines with a single plane crankshaft have only secondary and higher components unbalanced.

In many engines the components of the harmonic series above the secondary component have sufficiently low values and high frequencies that their presence was relatively unobjectionable and was outweighed by the expense of balancing them. Most prior art balancing mechanisms, therefore, used masses rotating in opposite directions on supplemental shafts positioned in the bottom of the crankcase to compensate for primary and/or secondary unbalance. These mechanisms generally were chain driven and required gears and bearings that added significantly to material and installation costs. Other prior art mechanism used a pivoted bracket connected to a balancing mass and riding at two points on a double lobed cam to balance either the primary or secondary inertia forces. The pivoted bracket mechanism, however, was not capable of balancing both the primary and secondary inertia forces and its use was confined to engines requiring supplemental balance of only one of these.

None of the prior art mechanisms was capable of balancing all the components of the harmonic series in any type of engine. Furthermore, designing the mechanisms was difficult and the mechanisms required numerous parts that add to internal friction, took up space, and increased material and assembly costs.

This assembly provides a mechanism for balancing the primary, secondary and higher components of the intertia forces acting on the reciprocating mass of any engine simply and effectively. The mechanism is operated from two cam surfaces formed on the engine crankshaft. A balancing mass slidable in the plane of the reciprocating mass of the engine is connected to followers riding on the cam surfaces. One of the cam surfaces is an external cam accelerating the balancing mass away from the crankshaft and decelerating the balancing mass when it is moving toward the crankshaft, while the other is an internal cam accelerating the balancing mass toward the crankshaft and decelerating the mass when it is moving away from the crankshaft. The cam surfaces are contoured so the inertia forces acting on the balancing mass counterbalance the inertia forces acting on the reciprocating mass.

Primary, secondary and/or higher components of reciprocating inertia forces can be balanced by a single mechanism of this invention. The mechanism is useful with equal efficiency in engines having any cylinder arrangement, is easy to design, and requires a minimum of parts.

DESCRIPTION OF THE DRAWINGS

FIGURE 1 is a sectional view taken from the side of a single cylinder engine in which the left crankshaft cheek has formed thereon an external cam and the right cheek has an internal cam. FIGURE 2 is an end view taken along line 2—2 of FIGURE 1 to show schematically the surfaces of the cams and to illustrate the method for generating the cam surfaces.

DETAILED DESCRIPTION

Figure 3:
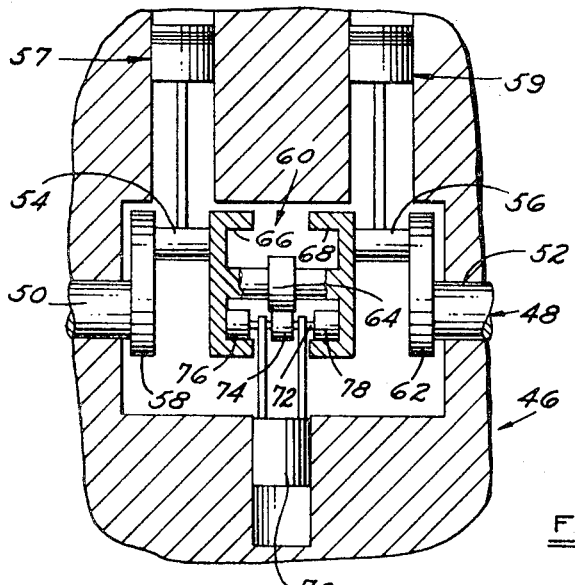
FIGURE 3 is a sectional view taken from the side of a two-cylinder in-line engine in which the balancing mass is located between the cylinders. The external cam surface is formed on the crankshaft between the rod pins and two duplicate internal cam surfaces are formed in opposing cheeks to elimiante bending stresses on the cam follower assembly.

Referring to FIGURE 1, the single cylinder engine has a cylinder block 10 with a crankshaft 12 mounted rotatably therein by two journal bearings 14 and 16. Crankshaft cheeks 18 and 20 connect journal bearings 14 and 16 with a rod pin 22 located radially outward from the center line of the crankshaft between bearings 14 and 16. A connecting rod 24 is connected rotatably at its lower end to rod pin 22 and at its upper end to a piston 26. Crankshaft 12 rotates in block 10 and connecting rod 24 and piston 26 reciprocate in a vertical plane in block 10.

Rotational unbalance of crankshaft 12 is compensated by adding appropriate counterbalancing mass to cheeks 18 and 20. The reciprocating mass of the piston 26 and connecting rod 24 produce inertia forces of which the primary and secondary components must be balanced to produce reasonably smooth engine operation. To balance these primary and secondary inertia forces, a balancing mass 28 is located on the lower side of the crankshaft in the plane of piston reciprocation that is parallel to the drawing paper.

Mass 28 slides in block 10 and is connected to a cross shaft 30 extending across cheeks 18 and 20. Rollers 32 and 34 are mounted on the ends of shaft 30 where roller 32 contacts an external cam surface 36 formed on cheek 18 and roller 34 contacts an internal cam surface 38 formed in cheek 20. Thus, roller 32 serves as a follower for cam surface 36 and roller 34 serves as a follower for cam surface 38. The rollers are constantly in touch with the respective cam surface.

Cam surfaces 36 and 38 are designed to move balancing mass 28 in conformance with the reciprocating motion of piston 26 and connecting rod 24. This is accomplished by computing the position of the piston at small increments of crankshaft rotation angle and forming the cam surfaces accordingly. The general equation giving the position of the piston 26, as shown by Heldt, High Speed Combustion Engines, chapter II, 12th edition, is $$x = \frac{l}{2}(1 - \cos\theta) + nl\left(1 - \sqrt{1 - \frac{\sin^2\theta}{4n^2}}\right) \ldots$$

where $x$=the distance of the piston from its top position,
$l$=the stroke of the piston,
$\theta$=the crank angle, and
$n$=the ratio of the length of the connecting rod to the stroke $l$.

In the equation, the two terms separated by the plus sign represent the primary and secondary components of the harmonic series needed to show piston motion exactly. Higher components of the series are balanced by simply including the appropriate terms in the equation.

The motion of the balancing mass 28 must be equivalent to the motion of piston 26 so by substituting appropriate values in this equation, the necessary positions of balancing mass 28 can be calculated. Values of $x$ are computed for small increments of crankshaft angle $\theta$ which, for practical purposes, is about every one-half degree.

FIGURE 2 contains arbitrary data showing how cam surfaces 36 and 38 are generated. In FIGURE 2, for purposes of illustration, $l$ is taken as one and $n$ as two. For simplicity, values of $x$ are presented for each five degrees of crankshaft rotation instead of each one-half degree.

The outlines of main bearing 14 and rod pin 22 are shown in FIGURE 2 for reference and the crankshaft rotates clockwise. Dashed line 40 represents the base circle for the axis of follower rollers 32 and 34 which is concentric with main bearings 14 and 16, and dashed line 42 represents the vertical deviation required of the axis of rollers 32 and 34 as line 42 rotates through the position of the rollers to produce the desired motion of balancing mass 28. Dashed line 42 deviates from base circle line 40 by the values of $x$ computed from the above equation. The heavier portions of lines 36 and 38 represent the approximate portions of the cam surfaces that are active in moving the balancing mass.

It is assumed for purposes of clarity that piston 26 accelerates from top dead center for approximately 80° of crankshaft rotation, decelerates for the next 100°, accelerates for 80° and finally decelerates for 100° to return to top dead center. During the first 80° of crankshaft rotation from the positions shown in FIGURE 2, piston 26 is accelerating inward and mass 28 also must be accelerated inward to produce the desired balance. Internal cam surface 38 produces the inward acceleration of mass 28 and surface 38 is contoured according to values produced by the equation so the axis of the rollers moves upward at the proper rate of acceleration. At the end of this acceleration, the point of cam surface 38 deviating from line 42 by .6474 inch has rotated to the bottom of FIGURE 2 and is contacting roller 34.

During the next 100° of crankshaft rotation, the inward motion of piston 26 is being decelerated and accordingly the inward motion of balancing mass 28 must be decelerated. External cam surface 36 actively positions roller 32 to produce this deceleration, at the end of which piston 26 is at bottom dead center and mass 28 is at the innermost point of its travel. The axis of the rollers then has zero deviation from line 42 and the point of the cam surfaces marked .0000 has rotated to the bottom of FIGURE 2 where it contacts the rollers.

Piston 26 accelerates outward for the next 80° of crankshaft rotation, and cam surface 36 acts through roller 32 to move mass 28 accordingly. Then cam surface 38 takes over to decelerate mass 28 while piston 26 is decelerating in the next 100° of rotation. Line 42 is symmetrical with respect to its vertical axis so values of $x$ need to be computed for only 180° of crankshaft rotation.

In FIGURE 3 the engine block is represented by numeral 46 and a crankshaft 48 having two main journal bearings 50 and 52 is mounted for rotation in block 46. Left and right rod pins 54 and 56, respectively, are formed in crankshaft 48 between bearings 50 and 52. Rod pin 54 is connected at one side through a cheek 58 to journal bearing 50 and at its other side to a central portion indicated by the numeral 60. Similarly, rod pin 56 is connected at one side through a cheek 62 to bearing 52 and at the other side to central portion 60.

Central portion 60 has an external cam surface 64 formed in the center thereof with two internal cams 66 and 68 on either side.

A balancing mass 70 is positioned directly below external cam surface 64 in the plane of pistons 57 and 59 parallel to the drawing paper. Mass 70 is connected to a cross shaft 72 that carries a center roller 74 bearing on external cam surface 64 and two side rollers 76 and 78 bearing on internal cam surfaces 66 and 68, respectively. Conventional piston and connecting rod assemblies 57 and 59 are connected to rod pins 54 and 56, respectively.

Internal cam surfaces 66 and 68 are identical to eliminate bending stresses on cross shaft 72. The contours of cam surfaces 64, 66 and 68 are developed in the manner described above to produce the balancing motion of balancing mass 70.

Figure 4:
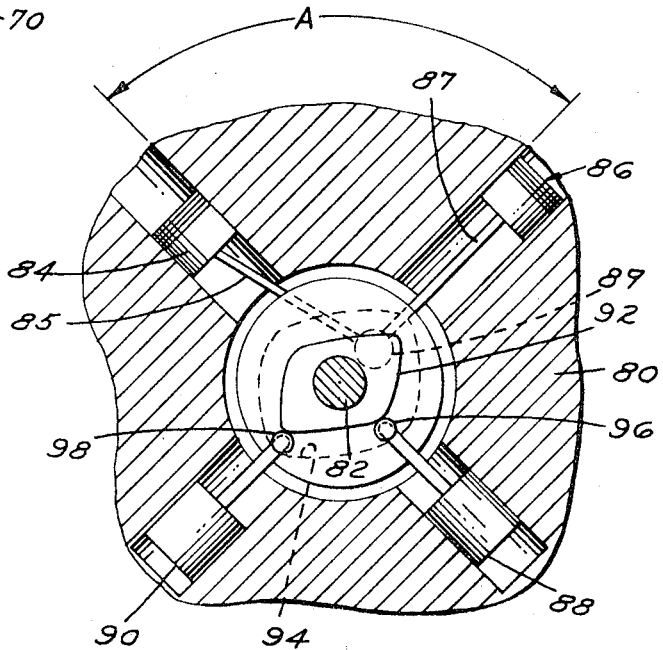
FIGURE 4 is an end view of a four-cylinder V-type engine with the cylinder banks at any angle A. Two balancing masses are required with each mass in the plane of one bank of cylinders. Both masses are operated by the same set of cam surfaces.

FIGURE 4 shows the application of the balancing mechanism to a V-type engine having two banks of cylinders at any angle A. The block of this engine is indicated by the numeral 80 and it contains a crankshaft 82 rotatably mounted therein in a conventional manner. Pistons 84 of the left bank and pistons 86 of the right bank are connected to crankshaft 82 through connecting rods 85 and 87 respectively, and a rod pin 89.

A balancing mass 88 for the left bank pistons 84 and associated connecting rods 85 is located in the plane of pistons 84 that passes through the drawing on the opposite side of crankshaft 82. Similarly, a balancing mass 90 for the right bank pistons 86 and associated connecting rods 87 is located in the plane of pistons 86 on the opposite side of crankshaft 82. Appropriate external cam surfaces 92 and internal cam surfaces 94 are formed on crankshaft 82 in the manner described above. The shapes of cam surfaces 92 and 94 are exaggerated slightly in FIGURE 4. A roller assembly 96 is attached to balancing mass 88 and rides on cam surfaces 92 and 94 to produce the desired balancing motion of mass 88 for the left bank pistons 84 and connecting rods 85. Similarly, a roller assembly 98 is connected to balancing mass 90 and rides on the same cam surfaces 92 and 94 to balance right bank pistons 86 and connecting rods 87.

If the primary component of the equation does not require balancing by supplemental means, that term of the equation is dropped and the contour of the internal and external cam surfaces are generated from the remaining terms. Thus, this invention provides a balancing mechanism that operates from the engine crankshaft to balance any or all components of the harmonic series of inertia forces acting on reciprocating components of an internal combustion engine. Because it operates directly from the engine crankshaft, the balancing mechanism is easy to design and is useful in engines having any cylinder arrangement.

What is claimed is:

1. In an internal combustion engine having a crankshaft rotating in an engine block and a reciprocating mass connected to said crankshaft, a balancing mechanism comprising a balancing mass slidable in the place of the reciprocating mass, follower means comprising two cam followers connected to said balancing mass, said follower means being reciprocable only in the plane of movement of said reciprocating mass and said balancing mass, a first cam surface formed on the crankshaft and contacted by one cam follower to accelerate the balancing mass away from the crankshaft and decelerate motion of the balancing mass toward the crankshaft, and a second cam surface formed on the crankshaft and contacted by the other cam follower to accelerate the balancing mass toward the crankshaft and decelerate motion of the balancing mass away from the crankshaft, said cam surfaces being contoured so the inertia forces on the balancing mass substantially balance the inertia forces on the reciprocating mass.

2. The engine of claim 1 in which one of the cam surfaces is formed on a cheek of the crankshaft.

3. The engine of claim 2 in which both cam surfaces are formed on cheeks of the crankshaft.

4. The engine of claim 3 having multiple cylinders arranged in a V and comprising two balancing masses, each of said masses being movable in the plane of one bank of cylinders.

5. The engine of claim 1 in which the cam followers are rollers rotatably connected to said balancing mass, said rollers being in rolling contact with said cam surfaces.

6. The engine of claim 1 in which said first cam surface is an exterior surface formed on a crankshaft cheek and the second cam surface is an interior surface formed on an adjacent crankshaft cheek.

7. The engine of claim 1 in which the crankshaft comprises a central portion located between two rod pins, said central portion comprising identical internal cam surfaces on each side of an external cam surface, said follower means comprising a rotatable cam follower bearing on each cam surface.

8. The engine of claim 4 in which each of said balancing masses is connected to individual follower means, each of said follower means bearing on the same cam surfaces.

References Cited

UNITED STATES PATENTS

| | | | |
|---|---|---|---|
| 284,827 | 9/1883 | Elwell | 74—604 |
| 1,851,669 | 3/1932 | Griswold | 74—604 |
| 2,235,160 | 3/1941 | Ljungström | 74—604 |

FRED C. MATTERN, Jr., Primary Examiner

F. D. SHOEMAKER, Assistant Examiner

U.S. Cl. X.R.

123—192